UNITED STATES PATENT OFFICE.

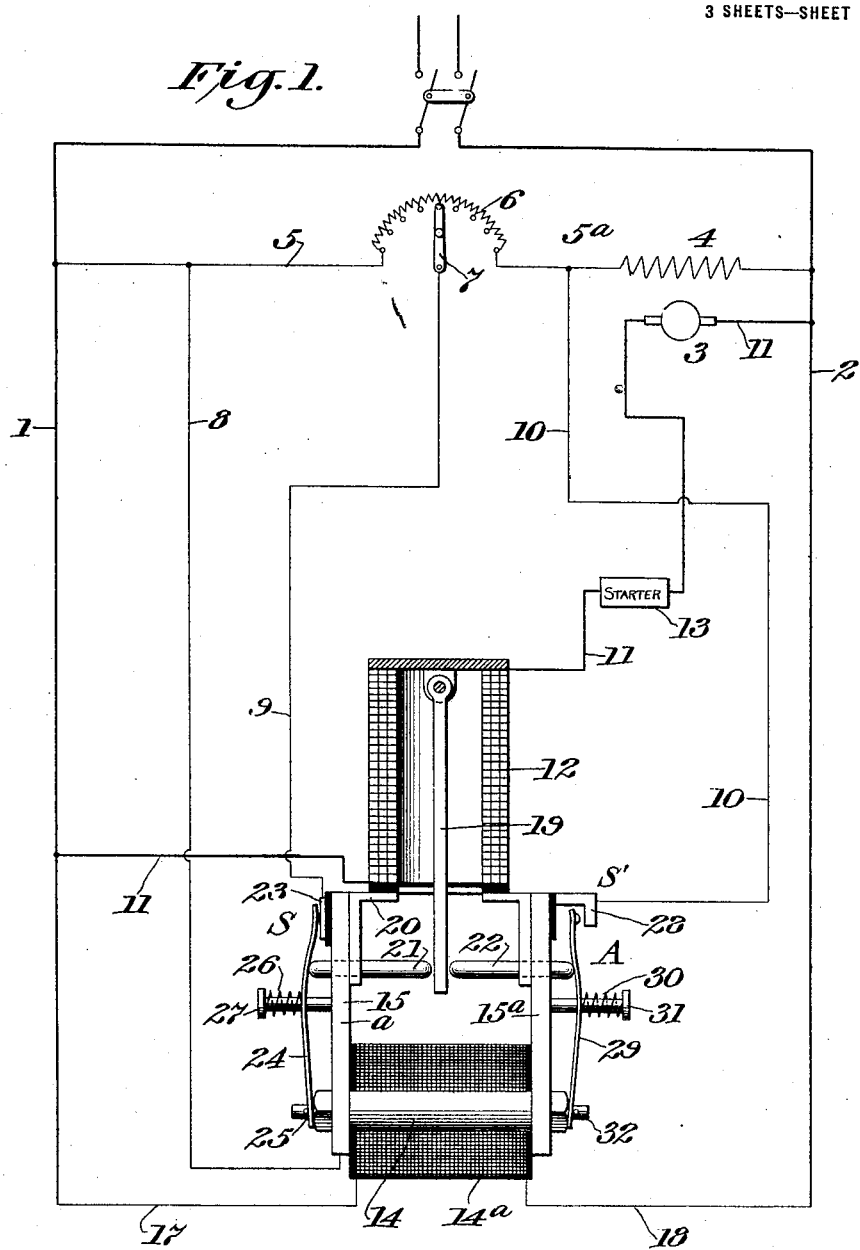

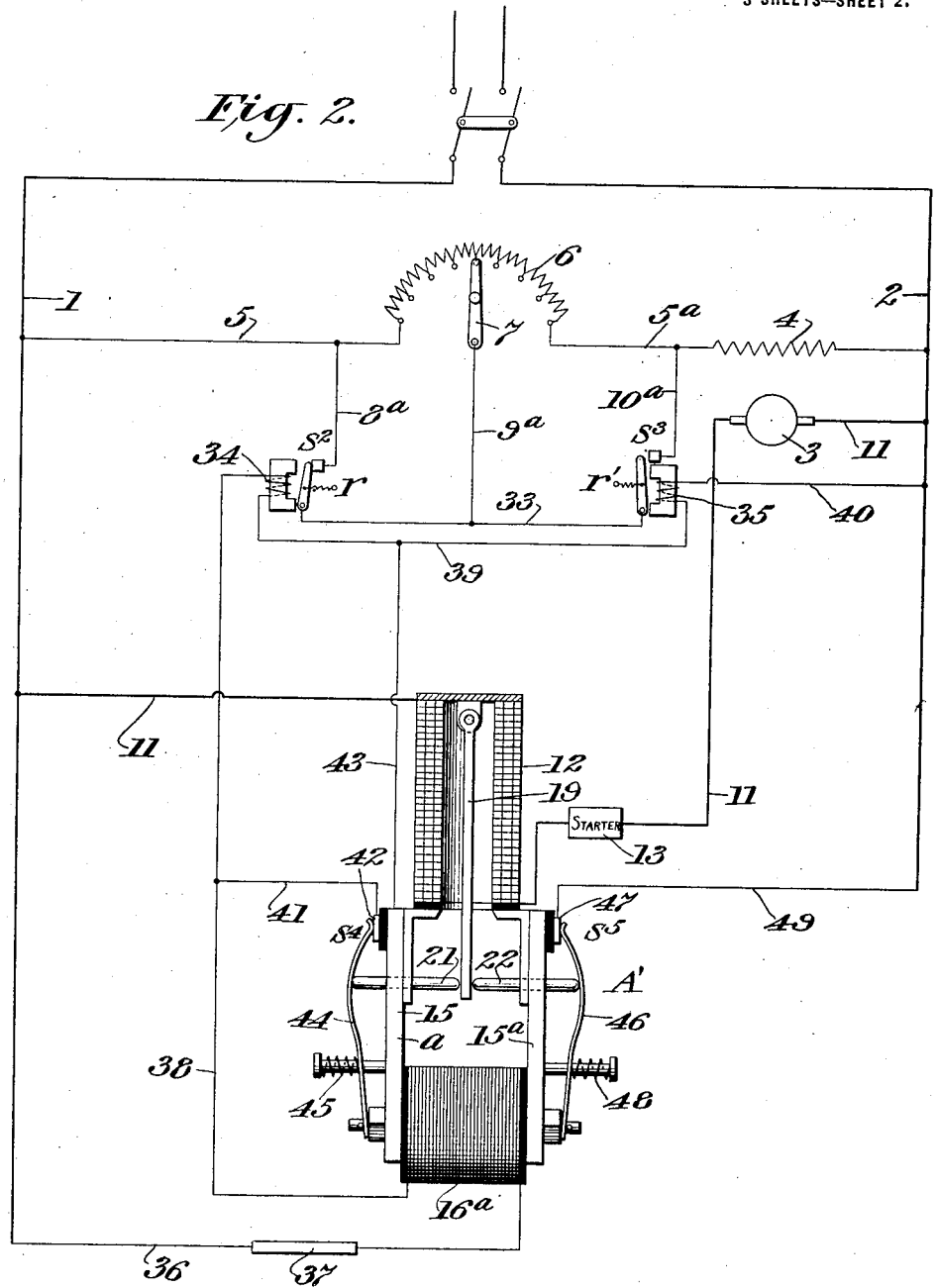

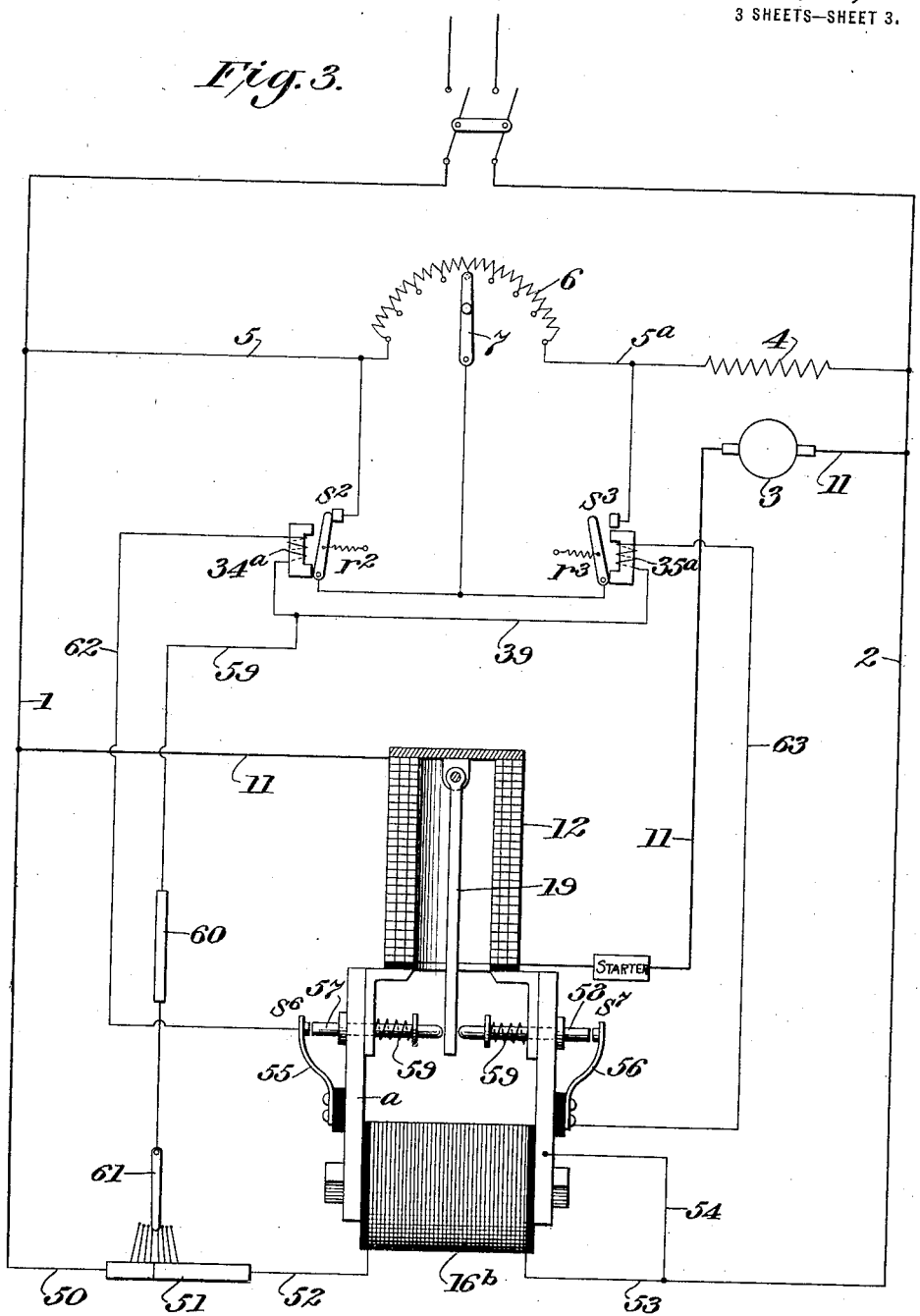

GEORGE H. WHITTINGHAM, OF BANCROFT PARK, MARYLAND, ASSIGNOR TO MONITOR CONTROLLER COMPANY OF BALTIMORE, OF BALTIMORE, MARYLAND, A CORPORATION OF MARYLAND.

REGULATOR FOR ELECTRIC MOTORS.

1,340,678.  Specification of Letters Patent.  Patented May 18, 1920.

Application filed October 23, 1917. Serial No. 198,061.

*To all whom it may concern:*

Be it known that I, GEORGE H. WHITTINGHAM, a citizen of the United States, residing at Bancroft Park, in the county of Baltimore and State of Maryland, have invented certain new and useful Improvements in Regulators for Electric Motors, of which the following is a specification.

This invention relates to controlling means for electric motors having shunt field windings, with a variable resistance in the field circuit for weakening and strengthening the field to vary the speed of the motor.

The invention comprises a regulating member for adjusting the amount of resistance in the shunt field circuit, a normally closed switch connecting said member in the field circuit, a normally open switch arranged in a circuit shunting the resistance, and means, common to said switches and controlled by the armature current, for vibrating the normally closed switch when the regulating member is moved to decrease the resistance in the field circuit, and for vibrating the normally open switch when said member is moved to increase the resistance in the field circuit. It is desirable to be able to set the hand regulating member for any desired running speed without causing an excessive amount of current to flow in the armature circuit, and this is accomplished by means of the vibrating switches which operate, upon change in the position of the regulating member, to rapidly throw in and out the field resistance until the motor adjusts itself to the running speed predetermined by the adjustment of the regulating member.

In the present invention, the normally closed and normally open switches are controlled directly or indirectly by a main relay mechanism comprising two magnetizable cores, or members, arranged within attractive distance of one another, one member movable to operate the switches, and the other stationary, one of said members being of fixed polarity and the other being variably polarized by the current in the armature circuit of the motor. The constantly polarized member may be a permanent magnet, but is preferably an electromagnet.

In the preferred form of the invention, auxiliary relays, adapted to make and break circuits carrying field current of any strengh, are arranged to vibrate the normally closed and normally open switches, and the main or master relay mechanism controls the flow of current to said auxiliary relays, which current is of small volume. An important feature in connection with the main relay mechanism is the provision of means for varying the attractive force between its magnetizable members instantly upon the opening or closing of either of its switches, thereby making the vibratory action of the movable member, controlling said switches, very sensitive.

In the accompanying drawing,

Figure 1 is a diagrammatic view illustrating the polarized switch mechanism of my invention arranged to directly control the field resistance of the motor;

Fig. 2 is a similar view, showing the polarized switch mechanism controlling the field resistance through two auxiliary relays, the magnet coils of the latter being normally short-circuited by said mechanism; and, Fig. 3 is a similar view in which the magnet coils of the auxiliary relays are normally on open circuit and the polarized relay mechanism controls the closure of said circuits.

Referring to Fig. 1 of the drawing, 1 and 2 indicate the supply wires, and 3 and 4 indicate, respectively, the armature and shunt field of a direct current motor. The field winding 4 is connected to the supply wires by a field circuit 5—5ª, in which is included a field resistance 6. A manually operable member 7, adjustable over the field resistance 6, determines the amount of resistance retained in the field circuit, and hence, the running speed of the motor. This regulating arm 7 is normally connected to the part 5 of the field circuit through a conductor 8, which leads from the conductor 5 to the metal frame of a relay switch mechanism A, thence through a normally closed switch *s* on said mechanism, and conductor 9, leading from one member of said switch to the regulating arm of member 7. When the switch *s* is open, the member 7 is excluded from the field circuit, and when said switch is closed, said member is included in the field circuit. The mechanism A comprises a normally open switch *s'*, which, when closed, short circuits the entire field resistance. This shunt circuit around the field resistance comprises the conductor 8, the frame of the mechanism A, the switch *s'*, and a conductor 10, leading from one member of the latter switch to the part 5ᵃ of the field circuit between the shunt field 4 and the resistance 6.

The armature circuit 11 extends from the supply wire 1, through a solenoid or magnet coil 12 on the relay switch mechanism A, thence through a suitable starter 13 to the armature 3, and thence to the supply wire 2.

The relay mechanism shown comprises a magnet $a$, of E-form, having a core 14 and extended parallel pole pieces 15 and 15ᵃ, and a magnetizing coil 14ᵃ of high resistance connected by conductors 17 and 18 to the opposite sides 1 and 2 of the supply circuits. While the motor is in operation, this coil is constantly energized and the ends of the pole pieces 15 and 15ᵃ are of constant polarity. These pole pieces project vertically upward and suspended midway between them is an iron armature 19, this armature being pivoted centrally at the upper end of the solenoid 12. The arrangement of said armature is such that it may swing, like a pendulum, between the pole pieces of the magnet. The solenoid is supported upon a suitable base 20, secured to the magnet pole pieces. The lower end of the pendulum armature 19, when swung to one side or the other from its central position, engages either a push rod 21 or a push rod 22, which actuate the switches $s$ and $s'$, respectively. As shown, the switch $s$ comprises a fixed contact 23 and a movable contact arm 24, which is pivoted at 25 and is normally pressed into engagement with the fixed contact by a spring 26, surrounding a stud 27, secured to the frame of the magnet $a$. The switch arm 24 is grounded upon the frame of the magnet, while the contact 23 is insulated therefrom. The switch $s'$ comprises a stationary insulated contact 28, and a contact arm 29 which is normally held out of engagement with the stationary contact by a spring 30 upon a stud 31, projecting from the magnet frame, the switch arm being pivoted at 32 to said frame. It will be evident that when the arm 19 moves to the left, in the drawing, it will, through the push rod 21, open the switch $s$, and that when the pendulum armature swings to the right it will cause the push rod 22 to close the switch $s'$.

The device illustrated in Fig. 1 of the drawing operates as follows: The pole pieces 15 and 15ᵃ are constantly polarized by the current flowing in the coil 14ᵃ, while the polarity of the swinging armature 19 varies according to the direction of current flowing in the armature at any moment, and an abnormal current in the armature circuit, in one direction or the other, will cause the armature 19 to move with sufficient force to actuate one of the switches $s$ or $s'$. If the resistance controlling member 7 is moved to the left, to increase the resistance in the field circuit and thereby weaken the field 4, the armature 3 will thereupon take more current, and the abnormal current in the armature circuit flowing through the solenoid coil 12, will cause the armature 19 to swing toward the pole piece 15ᵃ and thereby the switch arm 29 will be moved into engagement with the contact 28, thus closing the shunt circuit through conductors 8 and 10 around the entire resistance 6 and cutting out said resistance. Thereupon the current in the field 4 is strengthened and the current in the armature circuit is decreased, and the solenoid 12 is weakened and the armature 19 moves back toward its central position, permitting the switch $s'$ to open. This immediately re-introduces that part of the resistance 6 which is between the arm 7 and the shunt field, and the field is thereby weakened, causing the armature current to increase and the solenoid 12 to again strengthen the polarity of the pendulum armature 19. The latter is then attracted by the pole piece 15ᵃ, causing the switch $s'$ to again close and short circuit the resistance. This alternate closing and opening of the switch $s'$ occurs very rapidly and continues until the armature of the motor attains the speed determined by the position of the controller arm 7, when the normal current flows through the armature circuit and the pendulum armature 19 becomes inoperative to move the switch $s'$. If, on the other hand, the motor is running with considerable resistance in the field circuit and the handle or arm 7 is moved suddenly into a position to cut resistance out of the field circuit and reduce the speed of the motor, the armature of the motor while slowing down will act as a generator and send a current through the armature circuit in a reverse direction. This reverse current flowing through the coil 12 will change the polarity of the swinging armature 19 and the latter will be attracted toward the field pole 15, thus causing the switch $s$ to open and interrupting the circuit 8—9 to the controller arm 7. This interruption of said circuit introduces the entire resistance into the field circuit, and as a result the motor armature ceases momentarily to act as a generator and the polarity of the armature 19 is changed and said armature moves toward the central position, permitting the switch $s$ to close. This action of opening and closing the switch occurs repeatedly and rapidly until the motor armature attains a speed determined by the new position of the controller arm 7. Thus, the controller arm 7 may be moved in either direction as rapidly as desired to change the running speed of the motor, and the polarized controlling relay mechanism A will rapidly insert and remove field resistance until the motor attains the desired pre-set speed, thus causing a gradual change in the motor speed and preventing shocks to the motor and its load.

While the polarized relay mechanism may be used to directly control the cutting in and out of the field resistance, I prefer to use this mechanism in conjunction with auxiliary relays, as illustrated in Figs. 2 and 3. In these latter arrangements, the strength of the permanently polarized magnet is weakened when the pendulum armature is attracted toward either of its poles, thus making the apparatus more sensitive than in the arrangement above described, and the polarized apparatus controls the circuits of the auxiliary relays while the latter directly controls the resistance in the field circuit.

In Fig. 2, the supply wires, field and armature circuits are numbered and arranged the same as in Fig. 1. Two auxiliary relays $r$ and $r'$, shown conventionally, are provided, the former having a normally closed switch $s^2$, which connects the controller arm 7 to the part 5 of the field circuit through conductors $8^a$, 33, and $9^a$, and the latter having a normally open switch $s^3$, adapted to close the shunt circuit around the entire resistance, this shunt extending from part 5 of the field circuit, through conductor $8^a$, switch $s^2$, conductor 33, switch $s^3$, and conductor $10^a$ to the part $5^a$ of the field circuit. In the normal position of the switch $s^2$, the arm 7 is included in the field circuit, and when said switch is open, said arm is excluded from said circuit. When the switch $s^3$ is closed, the switch $s^2$ is always in its closed position, and therefore the entire field resistance is short circuited. The relays $r$ and $r'$ may be of any suitable design adapted to rapidly make and break currents of any strength or intensity flowing through their switch contacts. The magnet coils 34 and 35 of the auxiliary relay magnets are preferably of high resistance and are connected in series with one another and with the coil $16^a$ of the main relay mechanism $A'$, through a circuit extending from the supply wire 1, through conductor 36, in which is interposed a resistance 37, thence through coil $16^a$ and by conductor 38 to the magnet coil 34, thence through conductor 39 and magnet coil 35 to conductor 40, and thence to supply wire 2. The coils of both of the auxiliary relays are normally short circuited through switches $s^4$ and $s^5$ on the main relay $A'$. As shown, a conductor 41, connected to the conductor 38, leads to the stationary contact 42 of the switch $s^4$, and the movable contact 44 of said switch, which is normally held in closed position by a spring 45, is grounded on the frame or core of magnet $a$. The switch arm 46, on the opposite side of the main relay structure, is also grounded on the core of magnet $a$ and is normally held in closed position, against the stationary contact 47, by a spring 48, and said contact 47 is connected by conductor 49 to the side 2 of the supply circuit. Hence it will be seen that normally the coils 34 and 35 of the auxiliary relays will be bridged or short circuited, the current from the side 1 of the supply circuit taking the course through conductor 36, resistance 37, coil $16^a$, conductors 38 and 41 to switch $s^4$, thence through the core of magnet $a$ to switch $s^5$, thence through conductor 49 to the side 2 of the supply circuit. A conductor 43 connects the core or frame of the magnet $a$ with the conductor 39, which joins the coils of the auxiliary relays.

From this description, it will be evident that if the switch $s^4$ is opened, the shunt around the relay coil 34 will be interrupted and current will then flow from conductor 38 through said coil to conductor 43 and the frame of the magnet $a$, thence through switch $s^5$ and conductor 49 to the side 2 of the supply circuit. This will cause the coil 34 of relay $r$ to be energized, while the coil of relay 35 will remain short circuited. Upon the closure of switch $s^4$, the coil of relay $r$ will be again bridged, and it will be further evident that the rapid opening and closing of switch $s^4$ will cause a corresponding actuation of the switch $s^2$, which will rapidly connect and disconnect the arm 7 with the field circuit. The switch $s^5$ will always remain closed when the switch $s^4$ is being vibrated, and likewise, the switch $s^4$ will always remain closed while the switch $s^5$ is being vibrated. When the switch $s^5$ is opened, the shunt around the coil of relay $r'$ is broken and said coil becomes energized by current flowing from conductor 38, through conductor 41 and switch $s^4$ to the frame of magnet $a$, thence through conductors 43 and 39 to the relay coil 35, and thence through conductor 40 to the supply conductor 2. The closure of the switch $s^5$ short circuits the coil 35. Hence, a vibratory opening and closure of the switch $s^5$ will cause a rapid movement of the relay switch $s^3$ and hence a rapid inclusion and exclusion of the resistance 6 from the field circuit.

The actuation of the main relay mechanism $A'$ is much the same as in Fig. 1, the current in the armature circuit flowing through the coil 12, polarizing the swinging armature 19 upon the occurrence of an excessive flow of current in either direction in said circuit, and said swinging armature moves toward one of the fixed poles of the magnet $a$, causing one of the push rods 21 or 22 to actuate one of the switches $s^4$ or $s^5$, according to the direction in which the armature 19 moves. As the armature 19 moves from the mid-position toward either of the pole pieces of the magnet $a$, the mutual attraction between the pole pieces and said armature increases very rapidly as the distance between said parts decreases, according to a well known law, and hence it is desirable, as soon as the switch, $s^4$ or $s^5$, as the case may be, has opened, to lessen the attractive force of the magnet $a$ in order that the swinging armature 19 may move back quickly to nomal position and permit the switch to close. To this end, the circuits are so arranged that as soon as one of the switches $s^4$ or $s^5$ is opened by the movement of the armature 19, an additional resistance is thrown in series with the coil $16^a$ of the magnet $a$, and the addition of this resistance causes a reduction in the current flowing through said coil and a corresponding weakening of the poles of the magnet which permits the spring actuating the switch to force the swinging armature 19 toward the central position, and also to close the switch. Immediately upon the closure of the switch, this additional resistance is cut out, the magnet poles are strengthened and the armature 19 again swings over to open the switch. To accomplish this weakening and strengthening of the magnetism of the main relay magnet, the coils 34 and 35 of the auxiliary relays are made of comparatively high resistance and when the switch $s^4$ opens, breaking the shunt around the coil 34, the latter is included in series with the coil $16^a$, thus lessening the flow of current through the latter coil and weakening the magnet $a$; also, when the switch $s^5$ opens, the shunt around the relay coil 35 is broken and the latter is thrown in series with the coil $16^a$, causing a weakening of the magnet $a$. Thus, for instance, if the fixed resistance 37 is 1,000 ohms and the coil $16^a$ has a resistance of 500 ohms, and the coils 34 and 35 each have a resistance of 500 ohms, it will be evident that when both of the switches $s^4$ and $s^5$ are closed, short circuiting the coils 34 and 35, the resistance of the circuit through the coil $16^a$ will be 1,500 ohms, and when either the switch $s^4$ or switch $s^5$ is opened, the resistance of said circuit will be increased to 2,000 ohms by the inclusion of the coils of one of the auxiliary relays.

In the arrangement shown in Fig. 2, if the member 7 is moved suddenly over to the left to include more resistance in the field circuit, for a higher motor speed, the current in the armature circuit of the motor will suddenly increase, flowing in the same direction as before, and the swinging armature 19 will be attracted by the magnet $a$ in the direction to open the switch $s^5$, controlling the shunt around the coil of the relay $r'$, and the latter will instantly close the switch $s^3$ and short circuit the entire resistance 6. This causes the shunt field to become stronger and the current in the armature circuit to become weaker, and the inclusion of the coil 35 in series with the coil $16^a$ causes the magnet $a$ to become weaker and these agencies, acting together, lessen the attractive force between the armature 19 and the pole of the magnet $a$ and said armature swings back toward its central position, permitting the switch $s^5$ to close and short circuit the coils of the relay $r'$. The switch $s^3$ thereupon opens and the resistance 6, at the right of the arm 7, is again immediately included in the field circuit, weakening the motor field and causing an increase in the armature current, and the action described is repeated until the motor armature acquires the running speed predetermined by the setting of the arm 7. On the other hand, if the motor is running at a high speed, with a considerable amount of field resistance in circuit, and the member 7 is suddenly moved to the right to cut out field resistance and reduce the speed of the motor, the motor armature, acting as a generator, will send a current through the circuit 11 in the reverse direction and the swinging armature 19 will be polarized accordingly and attracted by the magnet $a$ in the direction to open the switch $s^4$. The opening of the switch $s^4$ interrupts the shunt around the coil 34 of relay $r$ and said relay opens the switch $s^2$, thereby disconnecting the member 7 from the field circuit and throwing into said circuit the entire resistance 6. While the switch $s^4$ is open, the coil 34 is in series with the coil $16^a$ and this causes a weakening of the magnet $a$, and the introduction of the resistance 6 in the field circuit weakens the field and causes the armature to cease generating, and these agencies, acting together, permit the armature 19 to swing back to central position, causing the closure of the switch $s^4$. Upon the closure of said switch, the relay coil 34 is cut out and the magnet $a$ is thereby strengthened and the switch $s^2$ is closed, again connecting the member 7 in circuit and short circuiting that portion of the resistance 6 at the left of said member. This action of cutting out and inserting the field resistance continues until the motor attains the lower speed predetermined by the setting of the arm 7.

In Fig. 3 of the drawing, the field and armature circuits of the motor are the same as in Figs. 1 and 2, and indicated by similar reference characters and the auxiliary relays operate vibrating switches which include and exclude the field resistance as in Fig. 2; but the magnet coils of the auxiliary relay switches, instead of being normally short circuited, by the main relay mechanism, as in Fig. 2, are normally on open circuit and when said mechanism is in operation, the circuit of one or the other of the auxiliary relay coils is rapidly made and broken. While in Fig. 2, the current strength in the coil of the magnet of the main relay is varied by intermittently including and excluding from the circuit thereof the coils of one or the other of the auxiliary relays, in Fig. 3, an arrangement is shown by which the current strength in the magnet coil of the main relay is varied by closing and opening a shunt circuit around said coil in which is included an adjustable resistance.

The main relay mechanism $A^2$, in Fig. 3, has its magnet coil $16^b$ connected across the line through a high resistance. As shown, the supply wire 1 is connected by conductor 50 to one end of a high resistance coil or rod 51, and the opposite end of said resistance is connected by a conductor 52 to one terminal of the coil $16^b$, and the other terminal of said coil is connected by conductor 53 to the supply wire 2. The frame of the magnet $a$ is grounded by a conductor 54, connected to said frame, and to the wire 53, and upon the frame are mounted two insulated switch members 55 and 56 and two grounded switch members 57 and 58, the latter in the form of metal push rods normally held out of engagement with the stationary contact by springs 59 and adapted to be moved into engagement with said contacts by the armature 19. The conductor 39, which joins coils $34^a$ and $35^a$ of the auxiliary relays, is connected by a conductor 59, through a fixed resistance 60, with a resistance controlling arm 61, which is adjustable upon the contacts of the resistance 51. One terminal of the relay coil $34^a$ is connected by conductor 62 to the stationary contact 55 on the main relay mechanism, and one terminal of the coil $35^a$ of the relay $r^3$ is connected by conductor 63 to the stationary contact member 56 on said mechanism.

With the arrangement of circuits just described, the circuits of both auxiliary relays are normally open at the switches $s^6$ and $s^7$, on the main relay mechanism. When the pendulum armature 19 swings to the left, closing the switch $s^6$, the coil $34^a$ of relay $r^2$ receives current from supply wire 1, through conductor 50, a part of the resistance 51, arm 61, conductor 59 and resistance 60, conductor 39, thence through the coil $34^a$, thence by conductor 62 to switch $s^6$, thence through the frame of magnet $a$ to conductor 54, and thence through conductor 53 to supply wire 2. This circuit just traced parallels the circuit through the coil $16^b$, and therefore the current through said latter coil becomes less and the poles of the magnet $a$ become weaker, lessening the attractive force on the armature 19. As soon as the switch $s^6$ opens, this parallel circuit is interrupted, the coil of relay $r^2$ is deënergized, and the coil $16^b$ receives its normal supply of current, thereby strengthening the magnet $a$. Similarly, when the armature 19 swings to the right, closing the switch $s^7$, a circuit paralleling the circuit of the coil $16^b$ is established, thereby weakening the magnet, this parallel circuit extending from supply wire 1, through conductor 50, and a part of the resistance 51 to arm 61, thence through conductor 59 and resistance 60 to the conductor 39, thence through coil $35^a$ of relay $r^3$, thence through conductor 63 to switch $s^7$, and thence through the frame of magnet $a$ and conductor 54 to conductor 53, and thence to supply wire 2. When the armature 19 swings back toward the central position, the switch $s^7$ opens and thereby the coil of relay $r^3$ is deënergized and the circuit paralleling the circuit of coil $16^b$ is broken.

It will be evident that when the regulating arm or member 7 is moved suddenly to a position to include a considerable portion of resistance 6 in the field circuit, to weaken the field and increase the speed of the motor, the resulting excess current in the armature circuit, flowing in the same direction as before, will cause the armature 19 to be strongly polarized and attracted by the magnet $a$ in the direction to close the switch $s^7$ and thereby energize the relay $r^3$, causing the normally open switch of said relay to close and short circuit the resistance 6. The closure of the circuit through the coil of relay $r^3$ establishes the shunt path previously described around the magnet coil $16^b$, causing the magnet $a$ to become weaker, and the short circuiting of the field resistance by the relay switch $s^3$ causes an increase in the current strength of the motor field and a decrease in the armature current. The swinging armature 19, which is controlled by the coil 12 in the armature circuit, then becomes less strongly magnetized by the armature current, and as the magnet $a$ is also weakened, said armature 19 moves back toward its central position, the spring 59 opening the switch $s^7$. When the switch $s^7$ opens, the circuit paralleling the coil $16^b$ is broken, and the coil of relay $r^3$ is deënergized and the switch $s^3$ opens, and that part of the field resistance 6 which is at the right of the arm 7 is introduced into the field circuit, again causing a weakening of the field and an increase of the armature current and a repetition of the actions just described. The switch $s^7$ and the switch $s^3$ continue to rapidly open and close until the motor armature acquires a speed corresponding to the position of the arm 7. When the motor is running above normal speed and the arm 7 is moved to the right, to reduce the resistance in the field circuit, the motor armature will act as a generator and reverse the current in the armature circuit, thereby causing a change in the polarity of the swinging armature 19, which will then move to the left and cause the closure of the switch $s^6$, which will bring into action the relay $r^2$ and cause the latter to open the switch $s^2$, which will disconnect the arm 7 from the field wire and include all of the resistance 6 in the field circuit. The reverse current in the armature circuit will thereupon cease and the magnet $a$ will be weakened by the diversion of current through the parallel circuit previously traced around its coil $16^b$ and through the coil $34^a$, and the armature 19 will swing back to central position, the spring 59 opening the switch $s^6$. This will be immediately followed by a repetition of the same operations, the switch $s^6$ and the switch $s^2$ rapidly opening and closing, and the latter switch alternately including and excluding resistance from the field circuit until the motor armature adjusts itself to the speed pre-determined by the setting of the arm 7. By adjusting the arm 61 on the resistance 51, the amount of current flowing through the coil $16^b$ and the amount diverted through the shunt around said coil, when one of the switches $s^6$ or $s^7$ is closed, can be proportioned so that the magnet $a$ will be weakened to any desired extent. Thus, after the armature 19 has moved toward one of the fixed pole pieces and closed one of the main relay switches, the attractive force between the armature 19 and the adjacent pole piece of the magnet $a$ is lessened instantly by the change in current strength in the coil $16^b$ and the armature 19 moves quickly backward, impelled by the spring which operates the switch; but instantly when the switch is opened, the magnetizing effect of the coils $16^b$ and 12 is increased and the armature 19 immediately presses the switch to closed position, this action being repeated indefinitely until the motor armature acquires the speed pre-determined by the setting of the arm 7.

In vibrating relays for controlling field resistance, shunt and series coils have sometimes been used on a single plunger or core which operates a relay switch; but under some conditions the magnetic flux due to the series coil overpowers the shunt coil and the device becomes ineffective or inoperative. In my invention, this does not occur. It will be noted that, in the drawing, the poles 15—$15^a$ of the magnet of the main relay are spaced apart to provide a relatively wide air gap; that the armature 19, which is centered in this gap, is of small cross sectional area, being merely a flat bar, and that the coils are on different parts, and spaced apart, the construction and arrangement of the various parts being such that the poles of the magnet cannot be reversed or seriously affected by the current changes in the series coil. While the series coil is applied to the armature and the shunt coil to the magnet, which is the preferred arrangement, it will be obvious that the series coil might be placed on the magnet and the shunt coil on the armature, in which case the armature would have a fixed polarity and the magnet a variable polarity.

What I claim is:

1. The combination with an electric motor having armature and shunt field circuits, of a resistance in the field circuit, a member adjustable over the resistance for regulating the running speed of the motor, a normally closed switch for including said member in said field circuit, a normally open switch for shunting said resistance, and electromagnetic means for controlling the operation of said switches comprising two magnetizable numbers, one having opposed pole-pieces, and the other arranged within the influence of said pole-pieces, one of said members being of constant polarity, and a coil in the armature circuit of the motor for polarizing the other member.

2. The combination with an electric motor having armature and shunt field circuits, of a resistance in the field circuit, a member adjustable over the resistance for regulating the running speed of the motor, a normally closed switch for including said member in said field circuit, a normally open switch for shunting said resistance, and means for controlling the operation of said switches comprising a magnet having opposed pole-pieces of constant polarity, an armature movable within the influence of said pole-pieces and a coil in the armature circuit of the motor for polarizing said armature.

3. The combination with an electric motor having armature and shunt field circuits, of a resistance in the shunt field circuit, a member for adjusting the amount of resistance in said field circuit, a normally closed switch for including said member in said field circuit, a normally open switch for shunting said resistance, and means for controlling the operation of said switches comprising a magnet having a coil and opposed pole-pieces projecting at one side of the coil, said pole-pieces spaced apart to provide a relatively wide air gap therebetween, an armature pivoted to swing between said pole-pieces and a coil surrounding said armature, one of said coils being connected in the armature circuit of the motor.

4. The combination with an electric motor having armature and shunt field circuits, of a resistance in the shunt field circuit, a member for adjusting the amount of resistance in said field circuit, a relay having a normally closed switch for including said member in said field circuit, a relay having a normally open switch for shunting said resistance, main relay switches for controlling the circuits of said first mentioned relays, and means common to both of said main switches and controlled by the current in the armature circuit for vibrating the latter switches.

5. The combination with an electric motor having armature and shunt field circuits, of a resistance in the shunt field circuit, a member for adjusting the amount of resistance in said field circuit, a relay having a normally closed switch for including said member in said field circuit, a relay having a normally open switch for shunting said resistance, and a main relay controlled by the current in the armature circuit and controlling the circuits of said first mentioned relays.

6. The combination with an electric motor having armature and shunt field circuits, of a resistance in the shunt field circuit, a member for adjusting the amount of resistance in said field circuit, a normally closed switch for including said member in said field circuit, a normally open switch for shunting said resistance, and means for controlling the operation of said switches comprising a magnet having a coil, an armature within the influence of the poles of the magnet and a coil for polarizing said armature, one of said coils being of low resistance and connected in the armature circuit of the motor, and the other being of high resistance, and means for lessening the current flow through the latter coil when said armature is attracted by one of said magnet-poles.

7. The combination with an electric motor having armature and shunt field circuits, of a resistance in the shunt field circuit, a member for adjusting the amount of resistance in said field circuit, a normally closed switch for including said member in said field circuit, a normally open switch for shunting said resistance, and means for controlling the operation of said switches comprising a magnet, an armature within the influence of the poles of the magnet, a coil in the armature circuit of the motor for polarizing said armature, and means for weakening the attractive force of the magnet when said armature approaches either of its poles.

8. The combination with an electric motor having armature and shunt field circuits, of a resistance in the shunt field circuit, a member for adjusting the amount of resistance in said field circuit, a relay having a normally closed switch for including said member in said field circuit, a relay having a normally open switch for shunting said resistance, and means for controlling the operation of said relays comprising a magnet having a high resistance coil, two normally closed switches in series with said magnet coil and normally shunting the coils of said relays, each switch adapted when open to include one of said relay coils in series with said magnet coil, an armature within the influence of the poles of said magnet, for operating said switches, and a coil in the armature circuit of the motor for polarizing said armature.

In testimony whereof I have affixed my signature.

GEORGE H. WHITTINGHAM.

It is hereby certified that in Letters Patent No. 1,340,678, granted May 18, 1920, upon the application of George H. Whittingham, of Bancroft Park, Maryland, for an improvement in "Regulators for Electric Motors," an error appears in the printed specification requiring correction as follows: Page 6, line 83, claim 1, for the word "numbers" read *members;* and that the said Letters Patent should be read with this correction therein that the same may conform to the record of the case in the Patent Office.

Signed and sealed this 8th day of June, A. D., 1920.

[SEAL.]

M. H. COULSTON,
*Acting Commissioner of Patents.*

Cl. 171—229.